(12) United States Patent
McClelland

(10) Patent No.: US 10,369,960 B2
(45) Date of Patent: Aug. 6, 2019

(54) ILLUMINATED SAFETY RESTRAINT SYSTEM

(71) Applicant: AGM Automotive, LLC, Troy, MI (US)

(72) Inventor: William Henry McClelland, Waterford, MI (US)

(73) Assignee: AGM Automotive, LLC, Wilmington, DE (US)

( * ) Notice: Subject to any disclaimer, the term of this patent is extended or adjusted under 35 U.S.C. 154(b) by 605 days.

(21) Appl. No.: 14/966,018

(22) Filed: Dec. 11, 2015

(65) Prior Publication Data

US 2016/0167574 A1    Jun. 16, 2016

Related U.S. Application Data

(60) Provisional application No. 62/091,002, filed on Dec. 12, 2014.

(51) Int. Cl.
*A44B 11/25* (2006.01)
*B60R 22/18* (2006.01)
*B60Q 3/76* (2017.01)

(52) U.S. Cl.
CPC .......... *B60R 22/18* (2013.01); *A44B 11/2565* (2013.01); *B60Q 3/76* (2017.02); *B60R 2022/1806* (2013.01)

(58) Field of Classification Search
CPC ......... B60Q 3/76; B60Q 3/44; A44B 11/2565; B60R 2022/1806; B60R 2022/1812; B60R 2022/1818; B60R 22/18
See application file for complete search history.

(56) References Cited

U.S. PATENT DOCUMENTS 4,237,586 A   12/1980   Morinaga
4,365,285 A   12/1982   Brundidge
(Continued)

FOREIGN PATENT DOCUMENTS

DE   202008005748 U1   7/2008
EP        1634780 A2    3/2006

OTHER PUBLICATIONS

Communication dated Apr. 19, 2016 enclosing the Extended European Search Report dated Apr. 4, 2016 for European Patent Application No. 15199385.4.

*Primary Examiner* — Anh T Mai
*Assistant Examiner* — Fatima N Farokhrooz
(74) *Attorney, Agent, or Firm* — Volpe and Koenig, P.C.

(57) ABSTRACT

An illuminated safety restraint system including a buckle assembly adapted to selectively releasably engage a corresponding clip. The buckle assembly includes a housing having an inner chamber defined therein, an outer surface, and at least one aperture extending between the outer surface and the inner chamber. A receiver is disposed in the inner chamber for releasably engaging the clip. A button is attached to the housing in the inner chamber, and is in communication with the receiver for selectively releasing the clip from the receiver. A cover is attached to the outer surface of the housing and has a lower surface spaced from the outer surface of the housing to define a cover chamber adjacent the aperture of the housing. A light module is disposed in the cover chamber adjacent the aperture for selectively emitting light so as to illuminate at least a portion of the button.

19 Claims, 8 Drawing Sheets

(56) References Cited

U.S. PATENT DOCUMENTS

| | | | |
|---|---|---|---|
| 4,443,835 A * | 4/1984 | Brautigam | G08B 5/36 |
| | | | 362/23.19 |
| 5,132,880 A | 7/1992 | Kawamura | |
| 5,149,189 A | 9/1992 | Kawamura | |
| 5,181,773 A | 1/1993 | Colvin | |
| 5,438,492 A | 8/1995 | Collins et al. | |
| 5,892,436 A | 4/1999 | Blackburn et al. | |
| 6,558,027 B2 | 5/2003 | Ellis et al. | |
| 7,340,809 B2 | 3/2008 | Tracy et al. | |
| 7,347,579 B2 | 3/2008 | Kohama et al. | |
| 7,360,794 B2 | 4/2008 | Kohama | |
| 7,568,265 B2 | 8/2009 | Kohama | |
| 2002/0122307 A1 | 9/2002 | Ellis et al. | |
| 2004/0052091 A1 * | 3/2004 | Lee | B60Q 3/85 |
| | | | 362/570 |
| 2007/0098971 A1 * | 5/2007 | Nguyen | D04H 11/00 |
| | | | 428/292.1 |
| 2015/0296928 A1 * | 10/2015 | Krauss | A44B 11/2546 |
| | | | 362/549 |

* cited by examiner

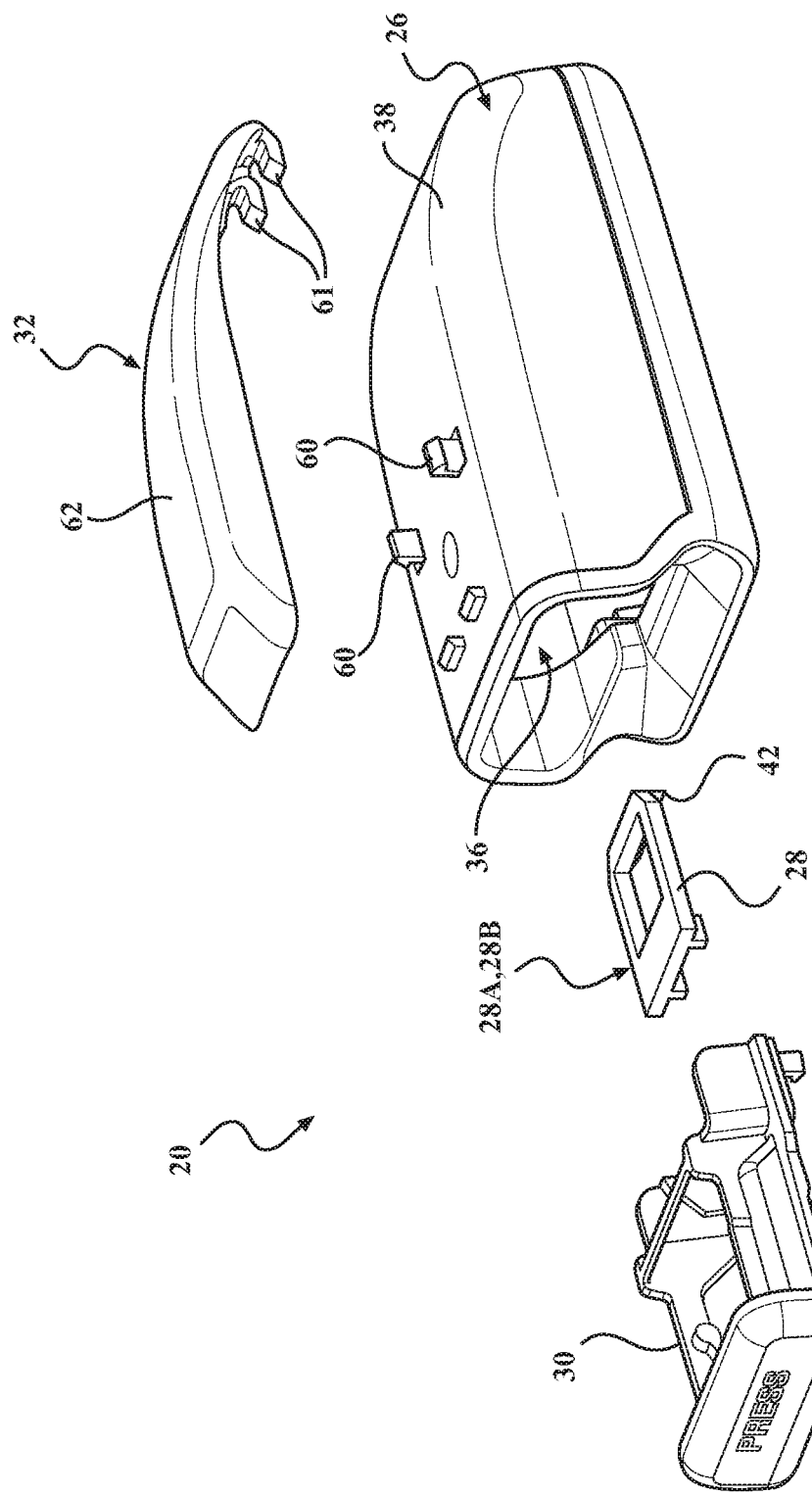

ILLUMINATED SAFETY RESTRAINT SYSTEM

CROSS-REFERENCE TO RELATED APPLICATIONS

This application claims the benefit of U.S. provisional patent application entitled "Illuminated Safety Restraint System," having Ser. No. 62/091,002, and filed on Dec. 12, 2014.

BACKGROUND OF THE INVENTION

1. Field of Invention

The present invention relates, generally, to safety restraint systems and, more specifically, to an illuminated safety restraint system.

2. Description of the Related Art

Conventional safety restraint systems known in the art typically include a safety belt assembly allocated for every seating position in a vehicle. The safety belt assembly secures a respective occupant of the seating position and prevents harmful movement that may otherwise occur due to a sudden change in vehicle speed, such as in a vehicle collision. The safety belt assembly typically includes a buckle assembly and a clip configured to releasably couple to one another such that the occupant can be selectively secured ("buckled") in the seating position and subsequently released ("un-buckled") when desired, such as when preparing to exit the vehicle. To that end, the buckle assembly typically includes a receiver that engages and secures to the clip, and a button that releases the clip from the receiver. The safety belt assembly also typically includes one or more belts secured to the vehicle as well as to the buckle assembly and/or the clip. The belt is adjustable in length so as to accommodate differently sized occupants. To that end, the safety belt assembly may include a spring-loaded reel to store and provide excess belt length as required.

The buckle assembly may be positioned and secured to the vehicle in different ways, depending on the vehicle application and the configuration of the seating position. The current trend in the art is a "three-point" or "shoulder belt" arrangement, where the buckle assembly is secured directly to a portion of the vehicle, such as on one side of a seat. The belt is "looped" and secured to another portion of the vehicle, such as on another side of the seat. In this arrangement, the clip is slidably secured to the belt "loop" which, in turn, is slidably "hung" by a hanger that is operatively attached to yet another portion of the vehicle, such as an elevated structural pillar. Thus, when the clip is coupled to the buckle assembly, the belt spans between both sides of the seat (over the occupant's lap) as well as between the clip and elevated hanger (across the occupant's shoulder).

Each of the components of safety restraint system of the type described above must cooperate to effect consistently releasable and safe restraint of the vehicle occupant. In addition, each of the components must be designed not only to facilitate improved usability, but also so as to reduce the cost and complexity of manufacturing and assembling safety restraint systems and associated components. While safety restraint systems known in the related art have generally performed well for their intended purpose, there remains a need in the art for a safety restraint system that has superior operational characteristics, and, at the same time, reduces the cost and complexity of manufacturing the components of the system.

SUMMARY OF THE INVENTION

The present invention overcomes the disadvantages in the related art in an illuminated safety restraint system including a buckle assembly adapted to selectively releasably engage a corresponding clip of the safety restraint system. The buckle assembly includes a housing having an inner chamber defined therein, an outer surface, and at least one aperture extending between the outer surface and the inner chamber. A receiver is disposed in the inner chamber for releasably engaging the clip. A button is operatively attached to the housing, is at least partially disposed in the inner chamber, and is in communication with the receiver for selectively releasing the clip from the receiver. A cover is operatively attached to the outer surface of the housing and has a lower surface spaced from the outer surface of the housing so as to define a cover chamber adjacent to the aperture of the housing. A light module is disposed in the cover chamber adjacent to the aperture of the housing for selectively emitting light so as to illuminate at least a portion of the button.

In addition, the present invention is directed toward an illuminated safety restraint system that includes a belt, a clip slidably attached to the belt, and a buckle assembly spaced from the belt for selectively releasably engaging the clip. The buckle assembly includes a housing having an inner chamber defined therein, an outer surface, and at least one aperture extending between the outer surface and the inner chamber. A receiver is disposed in the inner chamber for releasably engaging the clip. A button is operatively attached to the housing, at least partially disposed in the inner chamber, and is in communication with the receiver, for selectively releasing the clip from the receiver. A cover is operatively attached to the outer surface of the housing and has a lower surface spaced from the outer surface of the housing so as to define a cover chamber adjacent to the aperture of the housing. A light module is disposed in the cover chamber adjacent to the aperture of the housing for selectively emitting light so as to illuminate at least a portion of the button.

In this way, the present invention significantly improves the usability and functionality of safety restraint systems and their associated components. Moreover, the present invention reduces the cost of manufacturing safety restraint systems that have superior operational characteristics by facilitating implementation of illuminated buckle assemblies used in connection with a number of different applications.

BRIEF DESCRIPTION OF THE DRAWINGS

Other objects, features, and advantages of the present invention will be readily appreciated as the same becomes better understood after reading the subsequent description taken in connection with the accompanying drawing wherein:

FIG. 5 is a partially exploded perspective view of the buckle assembly of FIGS. 2-4, showing a housing, a button, a receiver, and a cover.

DETAILED DESCRIPTION OF THE INVENTION

Figure 1:
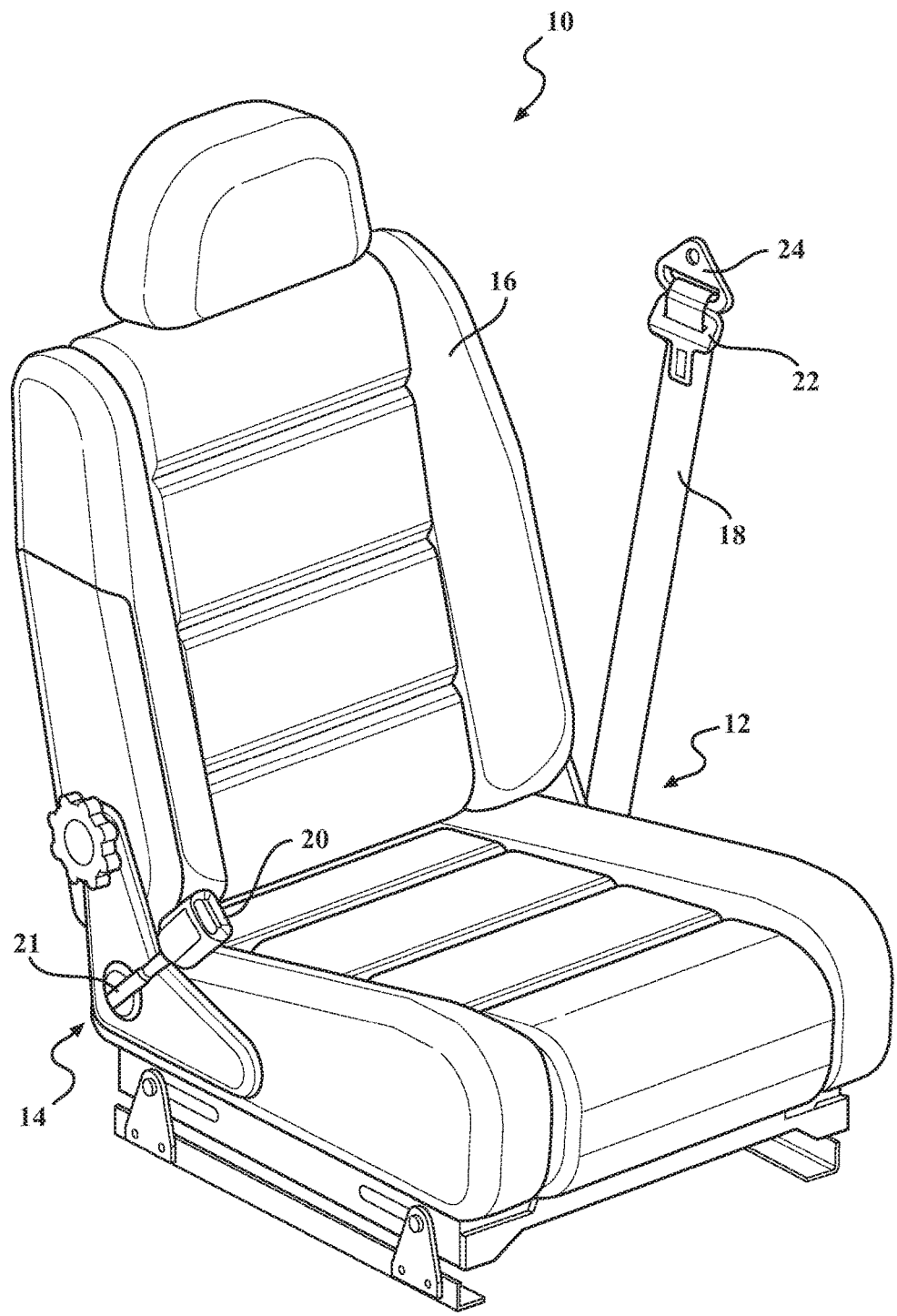
FIG. 1 is a perspective view of a safety restraint system having a seat, buckle assembly, clip, and belt, according to one embodiment of the present invention.
Figure 2:
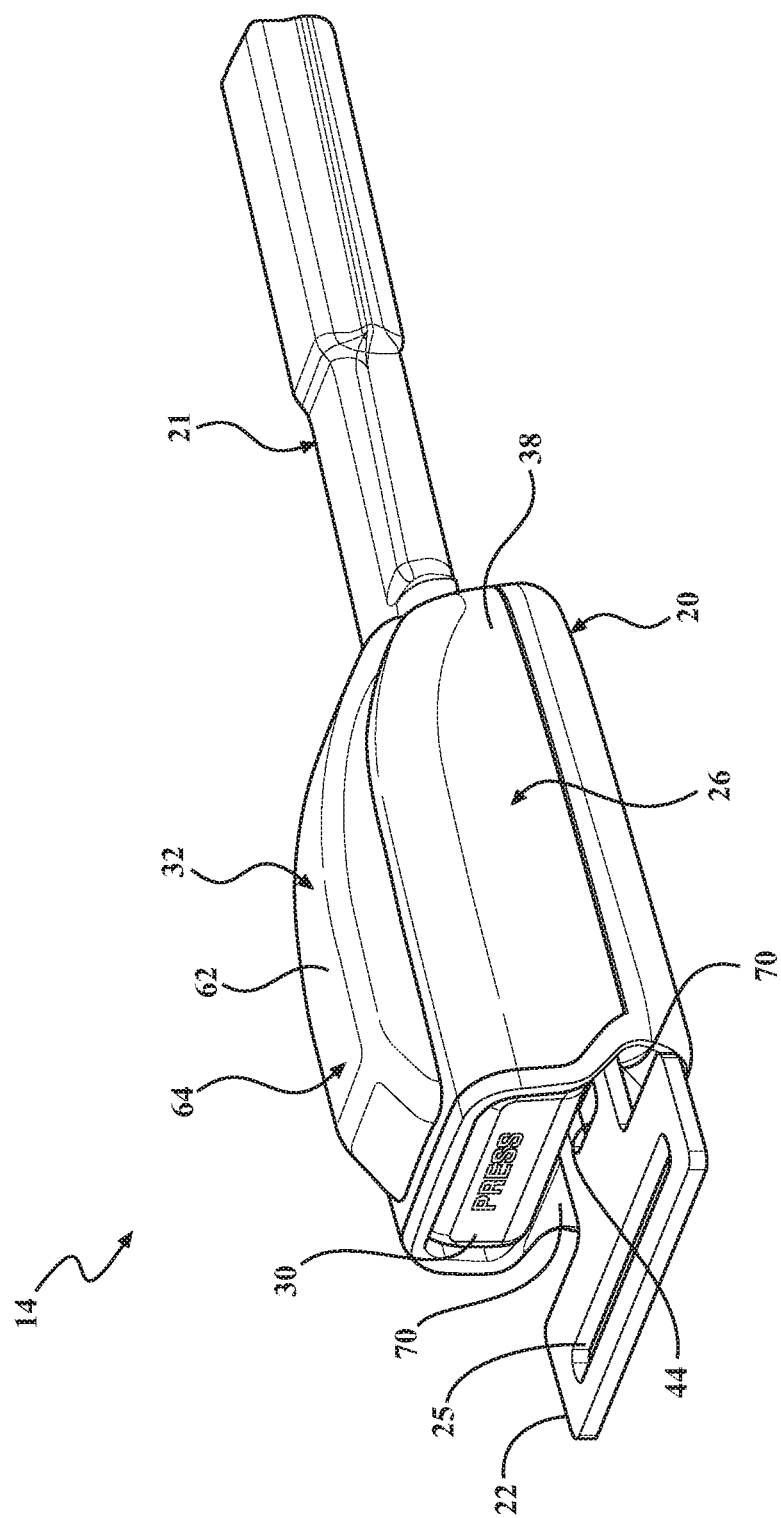
FIG. 2 is an enlarged perspective view of the buckle assembly and clip of FIG. 1 in an assembled configuration.

Referring now to the drawings, where like numerals are used to designate like structure, a portion of a vehicle interior is illustrated at 10 in FIG. 1. The vehicle 10 is adapted to transport one or more occupants in respective seating positions, generally indicated at 12. Each seating position 12 includes a safety restraint system 14 adapted to selectively releasably secure the occupant and to prevent harmful movement that may otherwise occur due to a sudden change in speed of the vehicle 10, such as in a collision. The safety restraint system 14 of the present invention is illuminated, as described in greater detail below. In the representative embodiment illustrated herein, the seating position 12 is a single-occupant "bucket" seat 16. However, those having ordinary skill in the art will appreciate that the seating position 12 and/or seat 16 could be configured or otherwise defined in any suitable way without departing from the scope of the present invention. By way of non-limiting example, the seating position 12 could be a bench seat (not shown, but generally known in the art) adapted to accommodate two or more occupants.

The safety restraint system 14 includes a belt 18, a buckle assembly 20, and a clip 22 that cooperate to selectively releasably secure the occupant to the seat 16, as noted above. The belt 18 is operatively attached to the vehicle 10 and is typically adjustable in length so as to accommodate differently sized occupants. To that end, the clip 22 is typically slidably attached to the belt 18 such that the clip 22 can move along the belt 18. It will be appreciated that the clip 22 can be slidably attached to the belt 18 in a number of different ways without departing from the scope of the present invention. By way of non-limiting example, the belt 18 could be "looped" with the clip 22 slidable therealong.

Figure 6:
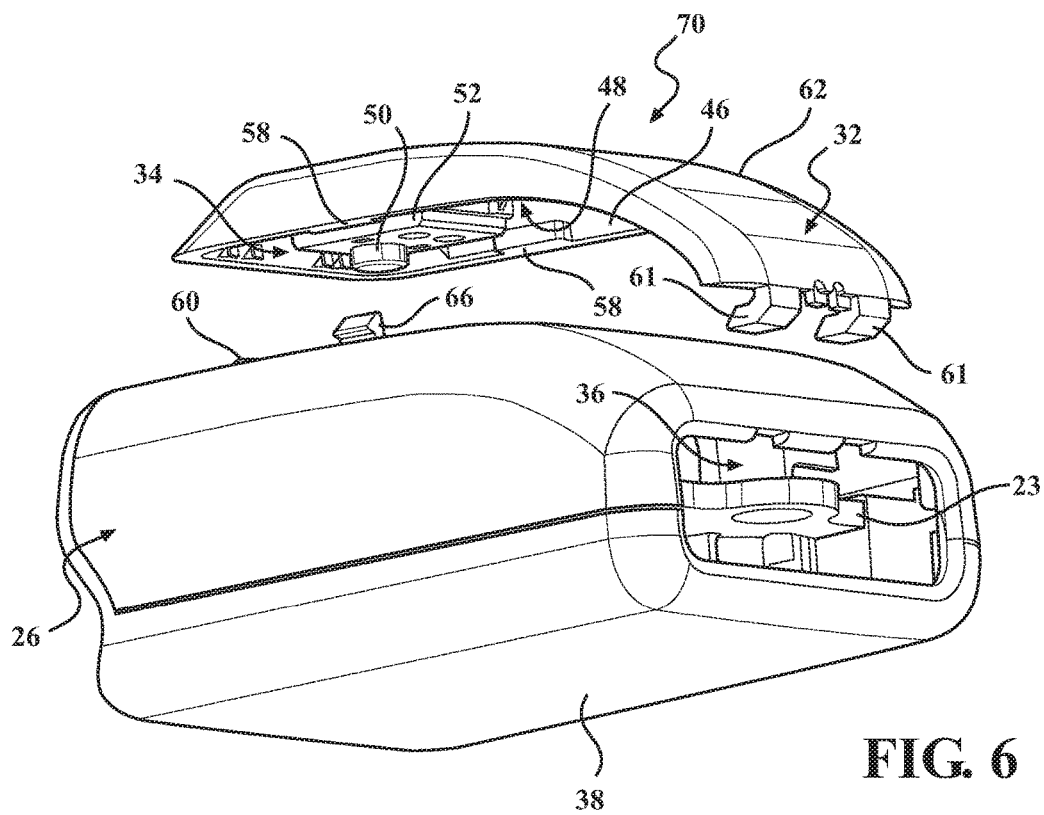
FIG. 6 is an alternate partially exploded perspective view of the buckle assembly of FIGS. 2-5, showing the housing, the cover, and a light module.
Figure 7:
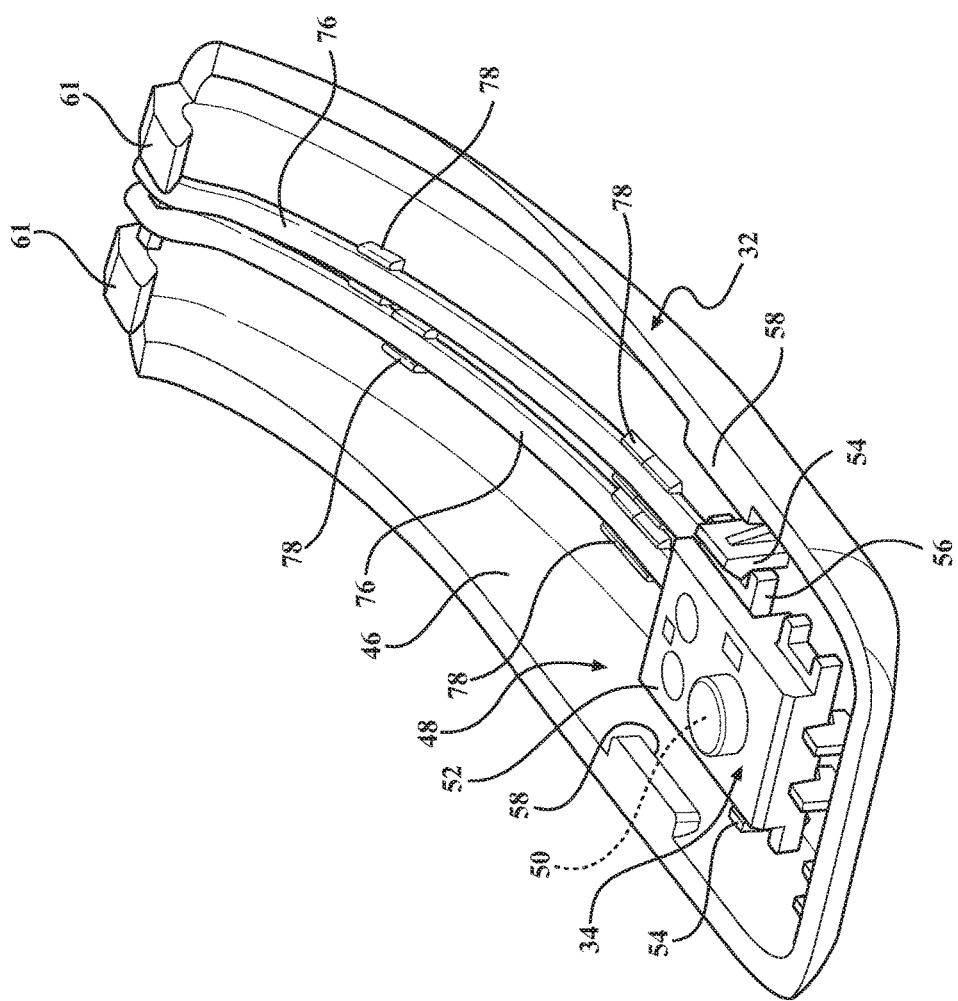
FIG. 7 is a perspective view of the cover and light module of FIG. 6.

The buckle assembly 20 is operatively attached to the vehicle 10 and is configured to selectively releasably couple to the clip 22 such that the occupant can be selectively secured ("buckled") in the seating position 12 and subsequently released ("un-buckled") when desired, such as when preparing to exit the vehicle 10. In the representative embodiment illustrated in FIG. 1, the buckle assembly 20 includes a semi-rigid pre-positioned mount 21 coupled to the seat 16. The mount 21 is operatively attached to the buckle assembly 20 via an anchor 23 (see FIG. 6; not shown in detail, but generally known in the art). However, those having ordinary skill in the art will appreciate that the buckle assembly 20 could be operatively attached to any portion of the seat 16 or vehicle 10, in any suitable position and/or in any suitable way, without departing from the scope of the present invention.

In the embodiment illustrated herein, the safety restraint system 14 also includes a hanger 24, through which a portion of the belt 18 is looped. The hanger 24 is typically elevated with respect to the buckle assembly 20, and may be operatively attached to either the seat 16 (not shown) or spaced from the seat 16 and attached to another portion of the vehicle 10, such as a pillar (not shown in detail, but generally known in the art). As noted above, the buckle assembly 20 is secured to the seat 16 via the mount 21, and is spaced from both the belt 18 and the clip 22. Those having ordinary skill in the art will recognize this as a "three-point" or "shoulder belt" arrangement, whereby when the clip 22 is coupled to the buckle assembly 20, the belt 18 spans the seat 16 (over the occupant's lap) as well as between the clip 22 and hanger 14 (across the occupant's shoulder). To that end, the clip 22 typically includes a belt slot 25 through which the belt 18 is looped. However, it will be appreciated from the description of the buckle assembly 20 below that the safety restraint system 14 could be designed in other ways without departing from the scope of the present invention. By way of non-limiting example, a "lap belt" arrangement could be utilized, whereby a pair of belts 18 each operatively attached to the clip 22 and buckle assembly 20 could span across the occupant's lap. Further, while the present invention is configured for use with automotive vehicles 10, those having ordinary skill in the art will appreciate that the present invention could be used with any suitable type of vehicle 10. By way of non-limiting example, the present invention could be used in connection with passenger or commercial vehicles, motorcycles, all-terrain vehicles, lawn care equipment, heavy-duty trucks, trains, airplanes, ships, construction vehicles and equipment, military vehicles, or any other suitable application.

Figure 3:
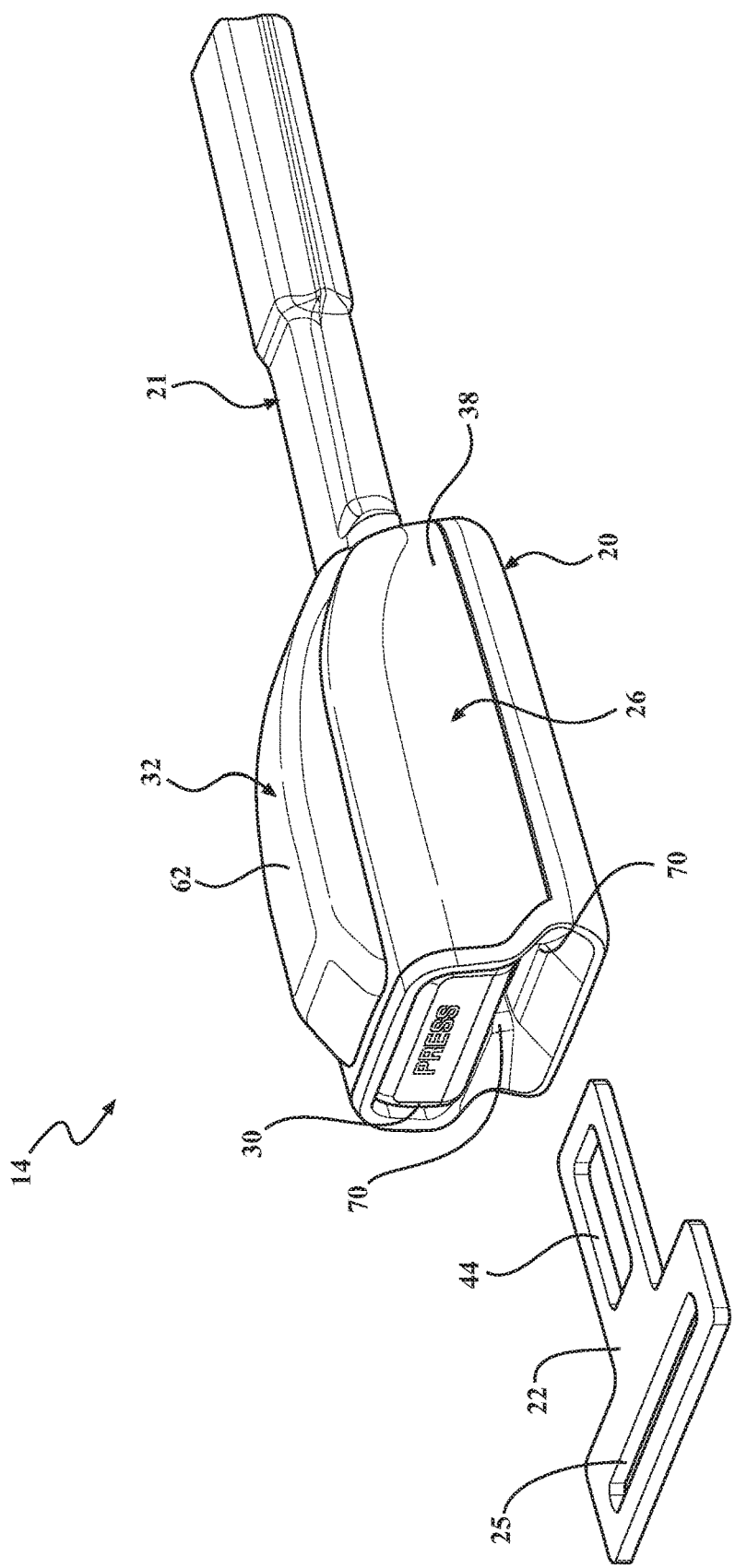
FIG. 3 is a perspective view of the buckle assembly and clip of FIG. 2 in a disassembled configuration.

Referring now to FIGS. 2-9B, the illuminated safety restraint system 14 according to one embodiment of the present invention is shown, with the buckle assembly 20 and clip 22 in a "buckled" configuration (FIG. 2), and an "unbuckled" configuration (FIG. 3). The buckle assembly 20 of the illuminated safety restraint system 14 of the present invention includes a housing 26, a receiver 28, a button 30, a cover 32, and a light module 34. Each of these components will be described in greater detail below.

Figure 8:
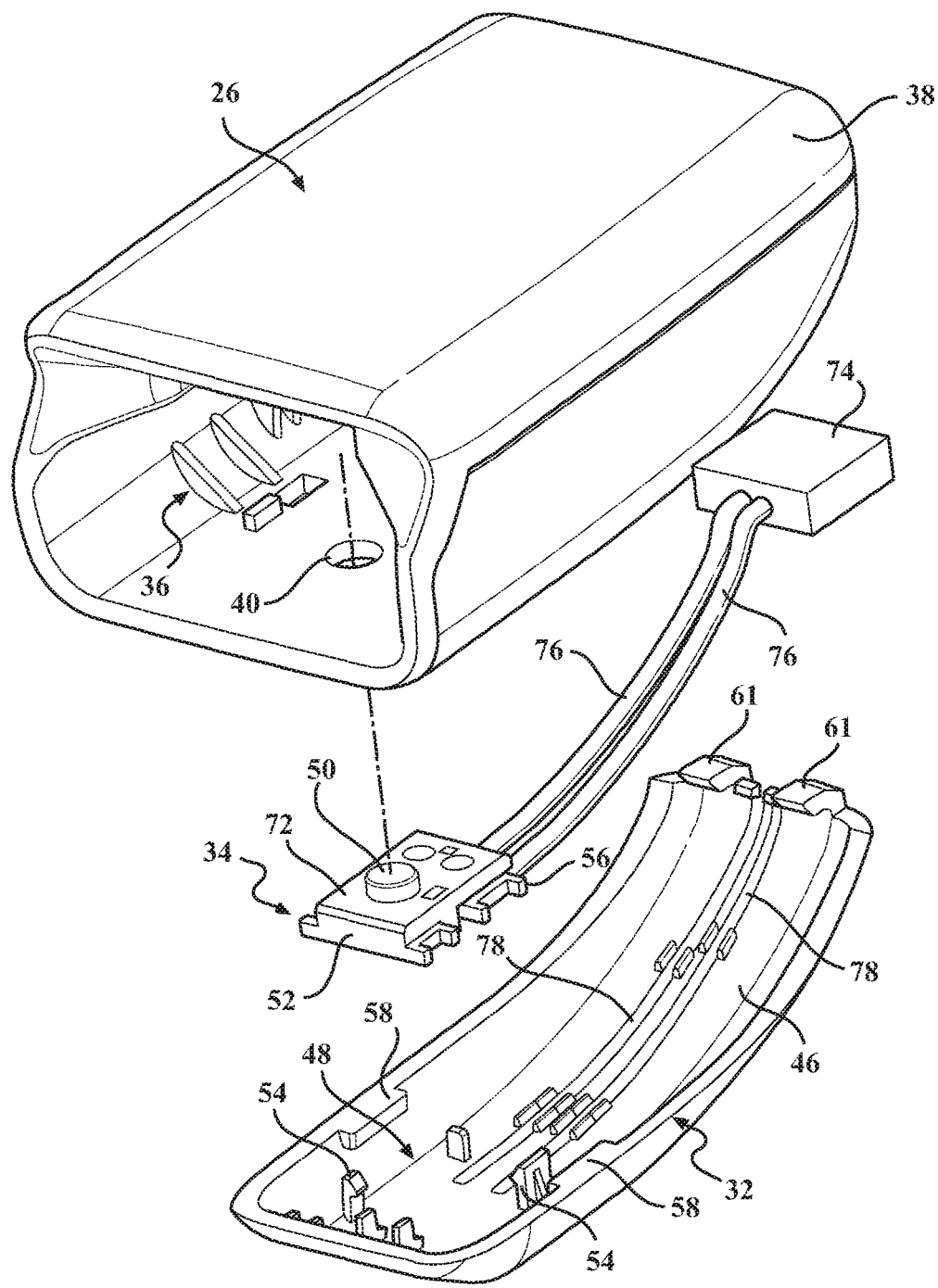
FIG. 8 is a partially exploded perspective view of the housing, cover, and light module of the buckle assembly of FIGS. 6-7.
Figure 9A:
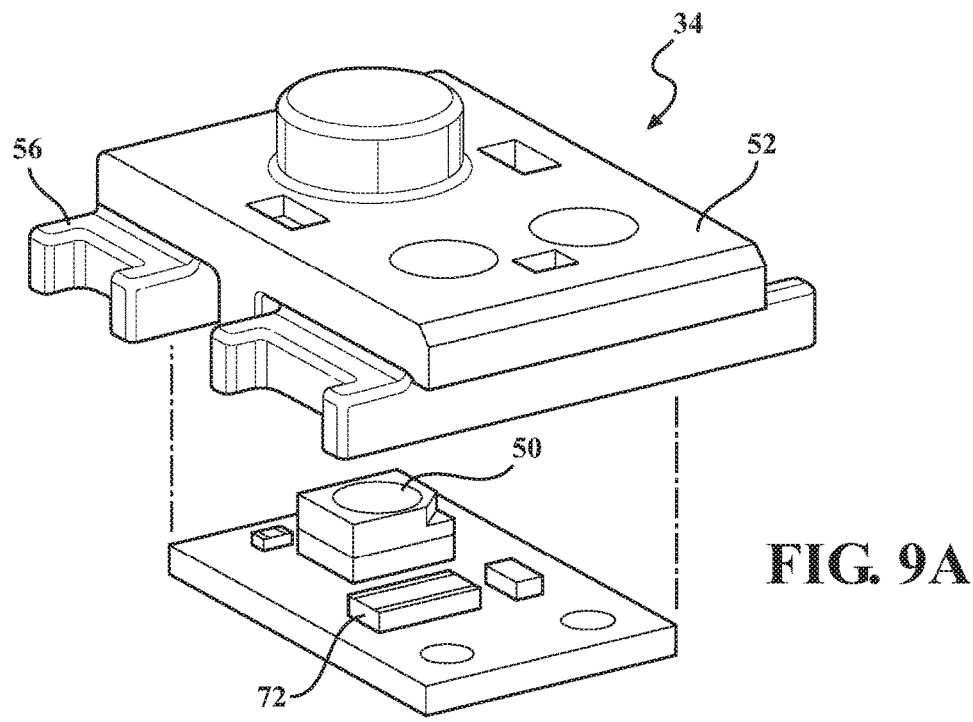
FIG. 9A is an exploded perspective view of the light module of FIGS. 6-8, showing a module chassis and a light source.
Figure 9B:
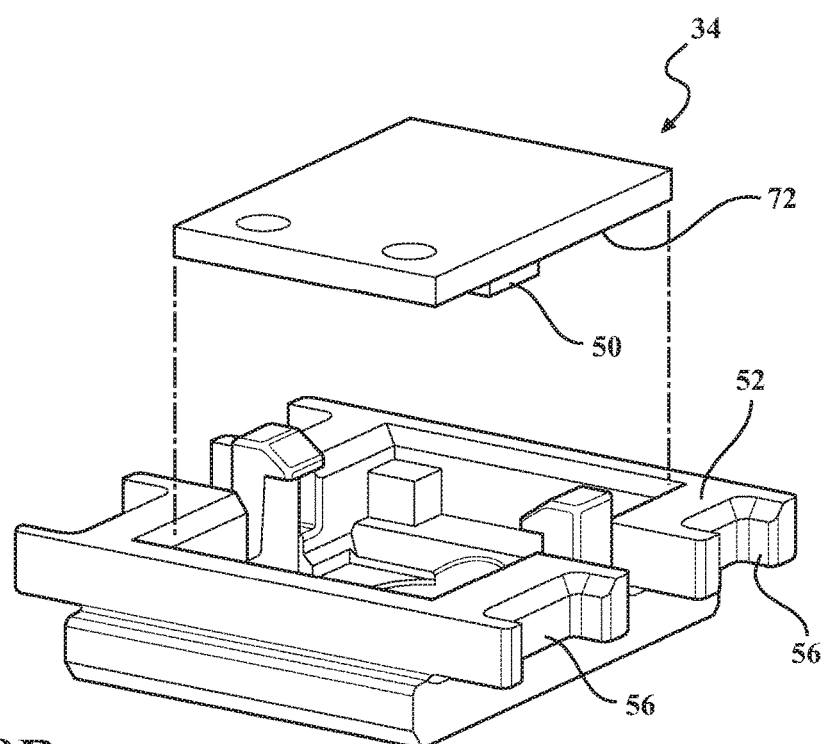
FIG. 9B is an alternate exploded perspective view of the module chassis and light source of FIG. 9A.

As shown best in FIGS. 5 and 8, the housing 26 has an inner chamber 36 defined therein for at least partially accommodating the button 30 and receiver 28, as described in greater detail below. The housing 26 has an outer surface 38 spaced from the inner chamber 36, and at least one aperture 40 extending between the outer surface 38 and the inner chamber 36. The aperture 40 of the housing 38 cooperates with the light module 34 so as to effect illumination of the buckle assembly 20, as described in greater detail below. While the housing 26 is typically manufactured from plastic using an injection molding process, and is illustrated throughout the figures as a unitary one-piece component, those having ordinary skill in the art will appreciate that the housing 26 could be defined by any number of components, manufactured from any suitable material and in any suitable way, without departing from the scope of the present invention.

Referring now to FIGS. 2-5, the receiver 28 is disposed in the inner chamber 36 of the housing 26 and is adapted to releasably engage the clip 22 (see FIG. 5). More specifically, the receiver 28 includes a clasp 42 that engages a clip aperture 44 of the clip 22. To that end, the receiver 28 is manufactured from a resilient material, such as spring steel, and cooperates with the button 30 so as to selectively move away from the clip aperture 44 of the clip 22. However, those having ordinary skill in the art will appreciate that the receiver 28 could be manufactured from any suitable material, and could be designed or configured in any suitable way sufficient to selectively releasably engage the clip 22, without departing from the scope of the present invention. The clasp 42 of the receiver 28 is in communication with the button 30 such that selective actuation of the button 30 releases the clip 22 from the receiver 28 of the buckle assembly 20 (compare FIG. 2 to FIG. 3), whereby the clip 22 can be removed from the buckle assembly 20. To that end, the receiver 28 is selectively movable between: a released position 28A, where the receiver 28 is disengaged from the clip 22; and a secured position 28B, where the receiver 28 is engaged to the clip 22, whereby the receiver 28 moves from the secured position 28B to the released position 28A in response to actuation of the button 30 (not shown in detail, but generally known in the art).

The cover 32 is operatively attached to the outer surface 38 of the housing 26 and has a lower surface 46 spaced from the outer surface 38 of the housing 26 so as to define a cover chamber 48 adjacent to the aperture 40 of the housing 26. The light module 34 is disposed in the cover chamber 48 adjacent to the aperture 40 of the housing 26 such that light selectively emitted from the light module 34 illuminates at least a portion of the button 30. To that end, the light module 34 includes a light source 50 for selectively emitting light, as discussed in greater detail below, and a module chassis 52 for securing the light source 50. In order to protect the light source 50 from moisture and/or liquid exposure, the light module 34 may be at least partially sealed by a conformal coating (not shown, but generally known in the art), such as HumiSeal UV40™, a UV-curable conformal coating.

Referring now to FIGS. 7-9B, in one embodiment, the cover 32 includes at least one resilient locking tab 54 depending from the lower surface 46 that cooperates with at least one respective engagement surface 56 of the light module 34 so as to releasably attach the light module 34 to the cover 32. In the representative embodiment illustrated herein, the cover 32 includes a pair of resilient locking tabs 54 that engage respective engagement surfaces 56 defined on the module chassis 52 of the light module 34. It will be appreciated that the locking tabs 54 and engagement surfaces 56 cooperate to effect installation of the light module 34 into the cover 32. Those having ordinary skill in the art will appreciate that the cover 32 and light module 34 could be designed in other ways, with or without the use of locking tabs 54, sufficient to operatively attach the light module 34 to the cover 32, without departing from the scope of the present invention.

In one embodiment, the cover 32 includes at least one shelf 58 extending into the cover chamber 48, and the outer surface 38 of the housing 26 has at least one respective resilient locking finger 60 extending therefrom. The locking finger 60 of the housing 26 cooperates with the shelf 58 so as to facilitate releasable attachment of the cover 32 to the housing 26. As shown best in FIGS. 7 and 8, the cover 32 has a pair of shelves 58 engaged by a respective pair of locking fingers 60 of the housing 26. However, those having ordinary skill in the art will appreciate that the housing 26 and the cover 32 could be designed with any suitable number of locking fingers 60 and/or shelves 58, or could be designed in any other way sufficient to operatively attach the cover 32 to the housing 26, without departing from the scope of the present invention. In one embodiment, the cover 32 includes a pair of rear hooks 61 that engage the housing 26 so as to facilitate assembly and provide additional rigidity to the buckle assembly 20. However, those having ordinary skill in the art will appreciate that the cover 32 could omit the rear hooks 61, or incorporate any other suitable type of securing feature, without departing from the scope of the present invention.

The cover 32 has an upper surface 62 spaced from the lower surface 46. In one embodiment, as shown by shading in FIG. 2, the upper surface 62 includes a textured coating 64 (not shown in detail, but generally known in the art) disposed at least partially thereon. The textured coating 64 provides enhanced reduction of noise, vibration, and harshness (NVH) in operation that may otherwise occur without the textured coating 64. By way of non-limiting example, the textured coating 64 may prevent rattling or squeaking of the buckle assembly 20 against the seat 16. It will be appreciated that the textured coating 64 may be applied to other areas of the buckle assembly 20, such as the outer surface 38 of the housing 26, without departing from the scope of the present invention. In one embodiment, the textured coating 64 is realized as an adhesive flocking applied to the cover 32 via a spraying process. However, those having ordinary skill in the art will appreciate that the textured coating 64 could be of any suitable type, applied in any suitable way, without departing from the scope of the present invention.

Referring now to FIGS. 2-5, as noted above, the button 30 is at least partially disposed in the inner chamber 36 of the housing 26 and is operatively attached to the housing 26. In one embodiment, the button 30 is manufactured from a material that is at least partially translucent, whereby the button 30 can be selectively illuminated by the light module 34. By way of non-limiting example, the button 30 could be entirely manufactured from a semi-transparent material, or could be partially manufactured from a semi-transparent material to effect illumination of text (such as "PRESS") or a logo (such as that of the vehicle manufacturer). Similarly, in one embodiment of the present invention, a gap 66 is defined between the button 30 and the inner chamber 36 of the housing 26 (see FIG. 4), whereby light selectively emitted from the light module 34 at least partially illuminates the gap 66.

Figure 4:
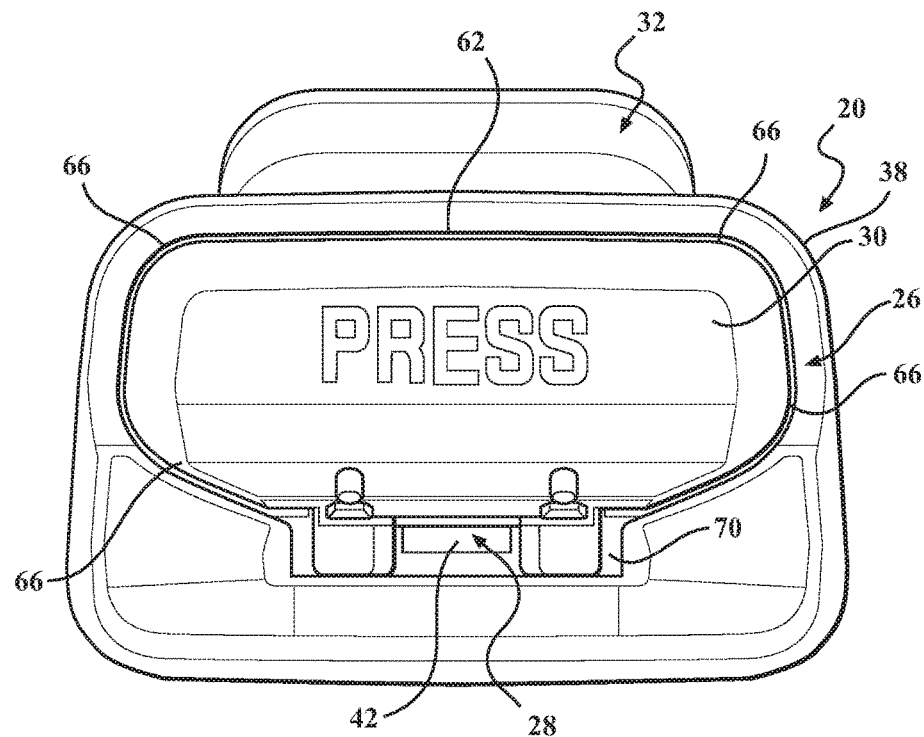
FIG. 4 is a front plan view of the buckle assembly of FIGS. 2-3.

As shown best in FIG. 4, in one embodiment, the housing 26 includes a slot 68 for accommodating at least a portion of the clip 22. However, it will be appreciated that the slot 68 could be realized in other locations of the buckle assembly 20, such as in or otherwise formed as a portion of the button 30, without departing from the scope of the present invention. In the "unbuckled" configuration (see FIG. 3), light selectively emitted from the light module 34 may at least partially illuminate the slot 68. Similarly, in the "buckled" configuration (see FIG. 2), the slot 68 and the clip 22 define a slot gap 70, whereby light selectively emitted from the light module 34 at least partially illuminates the slot gap 70.

It will be appreciated that selective illumination of portions of the buckle assembly 20, as described above, significantly improves visibility and aids the occupant in locating and using the safety restraint system 14, particularly in the dark. Moreover, the present invention affords opportunities for increased functionality of the safety restraint system 14. To that end, in one embodiment, the safety restraint system 14 may further include a sensor 72 (see FIG. 8) that is responsive to changes in position of the receiver 28 between the released position 28A and the secured position 28B. The sensor 72 may be disposed in any suitable location of the vehicle 10, such as in the light module 34 or the buckle assembly 20, and may be in electrical communication with either the light module 34 and/or a controller 74 (not shown in detail, but generally known in the art) used to selectively drive the light module 34 under predetermined conditions. The controller 74 is typically spaced from the buckle assembly 20 and is used to power and drive the light module 34. To that end, a wiring harness 76 may be operatively attached to and in electrical communication with the light module 34 and the controller 74. In one embodiment, the wiring harness 76 is at least partially accommodated in a guide 78 operatively attached to the lower surface 46 of the cover 32 (see FIG. 8). While the wiring harness 76 is adapted to effect electrical communication between the light module 34 and the controller 74, it will be appreciated that the controller 74 could also be realized at least partially within the light module 34, such as by an integrated circuit (not shown, but generally known in the art), without departing from the scope of the present invention.

The light module 34 has a first illumination state that corresponds to the receiver 28 being in the released position 28A, and a second illumination state that corresponds to the receiver 28 being in the secured position 28B. In one embodiment, at least one of the illumination states is further defined as light emission. However, it will be appreciated that more than two illumination states could be employed, defined in any suitable way and according to any suitable criteria, without departing from the scope of the present invention. By way of non-limiting example, illumination states could be defined by light emission in or at a specific wavelength, color, brightness, or intensity, as well as by any transition, variation, or pattern therebetween. In one embodiment, the light source 50 of the light module 34 includes or is otherwise realized as a common cathode light emitting diode (LED) for selectively emitting light in a plurality of predetermined colors, whereby the first illumination state may be further defined as light emission in a first color, and the second illumination state may be further defined as light emission in a second color. Thus, by way of non-limiting example, light may be emitted in a first color (such as red) when the receiver 28 of the buckle assembly 20 is in the released position 28A, and light may be emitted in a second color (such as white) when the receiver 28 is in the secured position 28B. Similarly, by way of non-limiting example, light may be emitted at a first intensity (such as "bright") when the receiver 28 of the buckle assembly 20 is in the released position 28A, and light may be emitted at a second intensity (such as "dim") when the receiver 28 is in the secured position 28B

In this way, the present invention significantly reduces the cost and complexity of manufacturing and assembling the safety restraint system 14 and its associated components. Specifically, it will be appreciated that the present invention is compatible with and can be incorporated modularly into a number of different types of buckle assemblies 20 without necessitating significant changes to existing manufacturing equipment and/or tooling. Moreover, those having ordinary skill in the art will appreciate that the selective illumination provided by the light module 34 affords increased visibility of the buckle assembly 20 and, at the same time, provides for illumination of the buckle assembly 20 that is dynamic, aesthetically pleasing, and indicative of the position of the receiver 28.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An illuminated safety restrain system comprising:
   a buckle assembly adapted to selectively releasably engage a corresponding clip of the safety restrain system, said buckled assembly including:
   a housing having an inner chamber defined therein, an outer surface, and at least one aperture located on an upper surface of said outer surface, said aperture extending between said outer surface and said inner chamber;
   a receiver disposed in said inner chamber for releasably engaging the clip;
   a button operatively attached to said housing, at least partially disposed in said inner chamber, and being in communication with said receiver, for selectively releasing the clip from said receiver;
   a cover operatively and releasably attached to said housing using a securing feature, said cover having a lower surface spaced from said outer surface of said housing so as to define a cover chamber located between said lower surface of said cover and said upper surface of said outer surface; and
   a light module disposed on said lower surface of said cover chamber adjacent to said aperture of said housing wherein said module emits light that is transmitted through said aperture into said inner chamber to illuminate at least a portion of said button by passing therethrough.

2. The illuminated safety restraint system as set forth in claim 1, wherein said button is manufactured from a material that is at least partially translucent.

3. The illuminated safety restraint system as set forth in claim 1, wherein a gap is defined between said button and said inner chamber of said housing, whereby light emitted from said light module at least partially illuminates said gap.

4. The illuminated safety restraint system as set forth in claim 1, wherein said button and/or said housing includes a slot for accommodating at least a portion of the clip, said slot defining a slot gap,
   whereby light emitted from said light module at least partially illuminates said slot gap.

5. The illuminated safety restraint system as set forth in claim 1, wherein said receiver is selectively movable between:
   a released position, where said receiver is disengaged from the clip; and
   a secured position, where said receiver is engaged to the clip.

6. The illuminated safety restraint system as set forth in claim 1, wherein said light module is at least partially sealed by a conformal coating.

7. The illuminated safety restraint system as set forth in claim 1, further including a wiring harness operatively attached to and in electrical communication with said light module.

8. The illuminated safety restraint system as set forth in claim 1, wherein said light module is operatively attached to said lower surface of said cover.

9. The illuminated safety restraint system as set forth in claim 1, wherein said cover has at least one shelf extending into said cover chamber, and said outer surface of said housing has at least one resilient locking finger for respectively cooperating with said at least one shelf so as to releasably attach said cover to said housing.

10. The illuminated safety restraint system as set forth in claim 1, wherein said cover includes an upper surface of said cover spaced from said lower surface, said upper surface of said cover having a textured coating.

11. The illuminated safety restraint system as set forth in claim 5, wherein said receiver moves from said secured position to said released position in response to actuation of said button.

12. The illuminated safety restraint system as set forth in claim 5, wherein said light module has a first illumination state corresponding to said receiver being in said released position, and a second illumination state corresponding to said receiver being in said secured position.

13. The illuminated safety restraint system as set forth in claim 5, further including a sensor that is responsive to changes in position of said receiver between said released position and said secured position.

14. The illuminated safety restraint system as set forth in claim 12, wherein at least one of said illumination states is further defined as light emission.

15. The illuminated safety restraint system as set forth in claim 12, wherein said light module includes a common cathode light emitting diode for selectively emitting light in a plurality of predetermined colors, and wherein said first illumination state is further defined as light emission in a first color, and said second illumination state is further defined as light emission in a second color.

16. The illuminated safety restraint system as set forth in claim 7, further including a guide operatively attached to said lower surface of said cover for at least partially accommodating said wiring harness therein.

17. The illuminated safety restraint system as set forth in claim 8, wherein said cover has at least one resilient locking tab depending from said lower surface for cooperating with at least one respective engagement surface of said light module so as to releasably attach said light module to said cover.

18. The illuminated safety restraint system as set forth in claim 10, wherein said textured coating is an adhesive flocking.

19. An illuminated safety restrain system comprising:
a belt;
a clip slidably attached to said belt; and
a buckled assembly spaced from said belt for selectively engaging said clip, said buckled assembly including:
a housing having an inner chamber defined therein, an outer surface, and at least one aperture located on an upper surface of said outer surface, said aperture extending between said outer surface and said inner chamber; a receiver disposed in said inner chamber for releasably engaging the clip;
a button operatively attached to said housing, at least partially disposed in said inner chamber, and being in communication with said receiver, for selectively releasing the clip from said receiver;
a cover operatively and releasbly attached to said housing using a securing feature, said cover having a lower surface spaced from outer surface of said housing so as to defined a cover chamber located between said lower surface of said cover and said upper surface of said outer surface; and
a light module disposed on said lower surface of said cover chamber adjacent to said aperture of said housing wherein said light module emits light that is transmitted through said aperture into said inner chamber to illuminate at least a portion of said button by passing therethrough.

* * * * *